United States Patent [19]

Cherry

[11] Patent Number: 5,308,959
[45] Date of Patent: May 3, 1994

[54] MAGNETIC STRIPE AND MAGNETIC INK CHARACTER RECOGNITION READER

[75] Inventor: John H. Cherry, Southlake, Tex.

[73] Assignee: Optowand, Inc., Irving, Tex.

[21] Appl. No.: 3,489

[22] Filed: Jan. 12, 1993

[51] Int. Cl.⁵ .................................................. G06F 15/30
[52] U.S. Cl. .................................. 235/379; 235/449; 382/29; 382/64
[58] Field of Search ......................... 382/29, 62, 64; 235/379, 480, 449

[56] References Cited

U.S. PATENT DOCUMENTS

| | | | |
|---|---|---|---|
| 3,092,024 | 6/1963 | Wagner | 101/297 |
| 3,605,092 | 9/1971 | Richard | 340/146.3 C |
| 4,060,711 | 11/1977 | Buros | 235/488 |
| 4,087,789 | 5/1978 | Beery | 340/146.3 C |
| 4,128,202 | 12/1978 | Buros | 235/493 |
| 4,143,355 | 3/1979 | MacIntyre | 340/146.3 C |
| 4,277,776 | 7/1981 | Nally et al. | 340/146.3 |
| 4,315,246 | 2/1982 | Milford | 340/146.3 D |
| 4,321,672 | 3/1982 | Braun et al. | 364/408 |
| 4,385,285 | 5/1983 | Horst et al. | 382/3 |
| 4,510,615 | 4/1985 | Rohrer | 382/7 |
| 4,564,752 | 1/1986 | Lepic et al. | 235/437 |
| 4,731,524 | 3/1988 | Brooks | 235/379 |
| 4,786,789 | 11/1988 | Gaucher | 235/432 |
| 4,827,531 | 5/1989 | Milford | 382/29 |
| 4,843,219 | 6/1989 | Franchi | 235/379 |
| 4,863,037 | 9/1989 | Stevens et al. | 209/3.1 |
| 4,891,240 | 1/1990 | Ward et al. | 427/11 |
| 4,947,027 | 8/1990 | Golightly | 235/448 |
| 4,984,281 | 1/1991 | Matsuhashi et al. | 382/7 |
| 5,080,986 | 1/1992 | Kmiecik-Lawrynowicz et al. | 430/39 |
| 5,195,133 | 3/1993 | Kapp et al. | 235/379 |
| 5,206,493 | 4/1993 | Anderson, Jr. et al. | 235/480 |

OTHER PUBLICATIONS

Magtek-MICR & Magnetic Stripe Card Reader Operator's Manual-1992.
Mag-Tek, Inc., 1991 Brochure-MICR/Magnetic Stripe Reader.
Robin Technologies, Inc., Jan., 1992, Brochure-ACRS Products Automatic Check Reading Systems.
Checkmate Electronics, Inc., 1991 Brochure-CHECKMATE TM MICR Readers.
Checkmate Electronics, Inc., 1988 Brochure-MICR-MATE TM SMR MICR Readers.
American Magnetics Corporation Brochure-Model 74X/75X E13B MICR Check/Magstripe TM Swipe Reader.
American Magnetics Corporation-Product Catalog.

Primary Examiner—Leo H. Boudreau
Assistant Examiner—Larry J. Prikockis
Attorney, Agent, or Firm—Weingarten, Schurgin, Gagnebin & Hayes

[57] ABSTRACT

A magnetic stripe and magnetic ink character recognition (MICR) reader is disclosed. A longitudinally extending magnetic stripe channel in the reader housing is sized to slidingly receive a medium bearing a magnetic stripe, such as a credit card or bank card. A magnetic stripe read head in the housing reads the data as the card is slid past the head. A MICR channel in the housing is sized to slidingly receive a medium bearing magnetic ink characters, such as a check. The MICR channel is curved along one portion to interconnect with the magnetic stripe channel. A drive mechanism in the housing drives a check along the MICR channel past a magnetizing head and a magnetic ink character recognition read head until the leading edge of the check extends into the magnetic stripe channel. A processor in the housing specifies the characters embodied in the magnetic data. The drive mechanism is reversible to return the check back along the MICR channel.

17 Claims, 10 Drawing Sheets

MAGNETIC STRIPE AND MAGNETIC INK CHARACTER RECOGNITION READER

RELATED APPLICATION

This application is related to design patent application entitled COMPACT MAGNETIC STRIPE AND MAGNETIC INK CHARACTER RECOGNITION READER filed on Jan. 6, 1993, by the same inventor.

FIELD OF THE INVENTION

This invention relates to the field of automatic data readers and more particularly to magnetic stripe and magnetic ink character recognition readers.

BACKGROUND OF THE INVENTION

Many financial transactions utilize checks, credit cards, debit cards, or bank cards. As the number of such transactions has greatly increased, various systems and devices have been developed to automate the processing of these transactions, thereby increasing their efficiency and accuracy.

Checks have been standardized to include certain information along the bottom edge for proper routing and processing of the check. The characters in which this information is encoded have been standardized for automatic processing. Two widely used standards are the E13B and CMC7 character fonts. The characters must be machine printed using a magnetizable ink, that is, an ink containing magnetizable particles, on an appropriate medium.

Magnetic ink character recognition (MICR) readers are used for reading the characters printed on checks. Typically, such devices include a magnetizing head, a magnetic read head, and circuitry for recognition of the characters. In operation, the check is passed over the magnetizing head, which magnetizes the magnetic particles in the ink, and over the read head, which detects the magnetization of the magnetized particles and transmits representative signals to the recognition circuitry. Frequently, a drive mechanism is provided to drive the check through a channel in the reader past the magnetizing and read heads. In many devices, the channel extends the length of the reader. One end of the check is inserted into one end of the channel and is driven the length of the reader along the channel until the opposite end of the check exits the opposite end of the channel, where it can be retrieved by a user or other automatic processing equipment.

Optical character readers may also be used to read the information encoded on checks. Such readers incorporate an optical character read head and circuitry for recognition of the optical characters. Optical characters typically conform to a predetermined specification such as ANSI X 3.17.

Credit cards or bank cards contain information encoded on a magnetic stripe on one side of the card. The stripes typically include up to three tracks. Information is encoded on the tracks in accordance with certain standards, such as ANSI X 4.16 and ISO 3554, specifications for magnetic stripe encoding. Track 1 has been developed for use by the air transportation industry, track 2 for the banking industry, and track 3 for the thrift industry. Magnetic stripe readers include a magnetic stripe read head and circuitry for recognition of the encoded information. In operation, the magnetic stripe of the credit or bank card is passed over the read head.

Magnetic stripe readers are used in retail establishments for processing purchases made with a credit card. Typically, these devices are located close to a cash register and include a slot or channel, open at both ends, through which a sales clerk at the point of sale slides or "swipes" the card. Financial institutions often locate magnetic stripe readers at a teller's window. As with the point of sale readers, a banking customer swipes the card through an open-ended slot in the reader to provide identification.

As the use of encoded data in the form of magnetic ink characters and magnetic stripes has proliferated, it has become increasing desirable to have both a MICR reader and a magnetic stripe reader at the same location. A MICR reader and a magnetic stripe reader have been combined in a single unit. However, such prior art devices are generally bulky and take up a lot of area on the counter where they must be placed. The electronic components of the MICR reader must be kept sufficiently far away from the magnetic stripe reader to avoid erasing the magnetic stripe data on a card passing through the magnetic stripe slot. Also, the area around both ends of the device must be kept relatively free of other objects to provide unrestricted access to the slots or channels, particularly for checks, which comprise a paper medium and are more easily bent or torn. Frequently, however, the counter where such readers are used comprises a relatively small area, and clutter and other necessary apparatus is also present, further restricting the available space. Thus, there exists a need for a compact MICR and magnetic stripe reader which takes up relatively little space, while maintaining ease and efficiency of operation.

SUMMARY OF THE INVENTION

The present invention provides a magnetic stripe and magnetic ink character recognition (MICR) reader. The reader incorporates a channel configuration which utilizes space in an efficient manner while maintaining ease and efficiency of operation.

The reader includes a longitudinally extending magnetic stripe channel in the top surface of the reader housing sized to slidingly receive a medium bearing a magnetic stripe, such as a credit card or bank card. A magnetic stripe read head and magnetic stripe recognition circuitry are contained within the housing.

A MICR channel in the top surface is sized to slidingly receive a medium bearing magnetic ink characters, such as a check. The MICR channel includes a first straight path portion, generally parallel to the magnetic stripe channel, and a curved path portion which interconnects the straight path portion with the magnetic stripe channel. A drive mechanism inside the housing drives a check along the MICR channel such that the leading edge of the check extends into a portion of the magnetic stripe channel. The drive mechanism is reversible, so that the check is returned back along the same path.

A magnetizing head and a magnetic ink character recognition read head ar located adjacent the MICR channel to read the data and transmit signals representative thereof to a digital signal processor for specifying the characters embodied in the data. The magnetizing and read heads and circuitry are spaced sufficiently distant from the magnetic stripe channel to preclude interference with magnetic stripe data passing through the magnetic stripe channel.

An optical character read head may also be included in the housing for reading optical characters.

DESCRIPTION OF THE DRAWINGS

The invention will be more fully understood from the following detailed description taken in conjunction with the accompanying drawings in which.

DETAILED DESCRIPTION OF THE INVENTION

Figure 1:
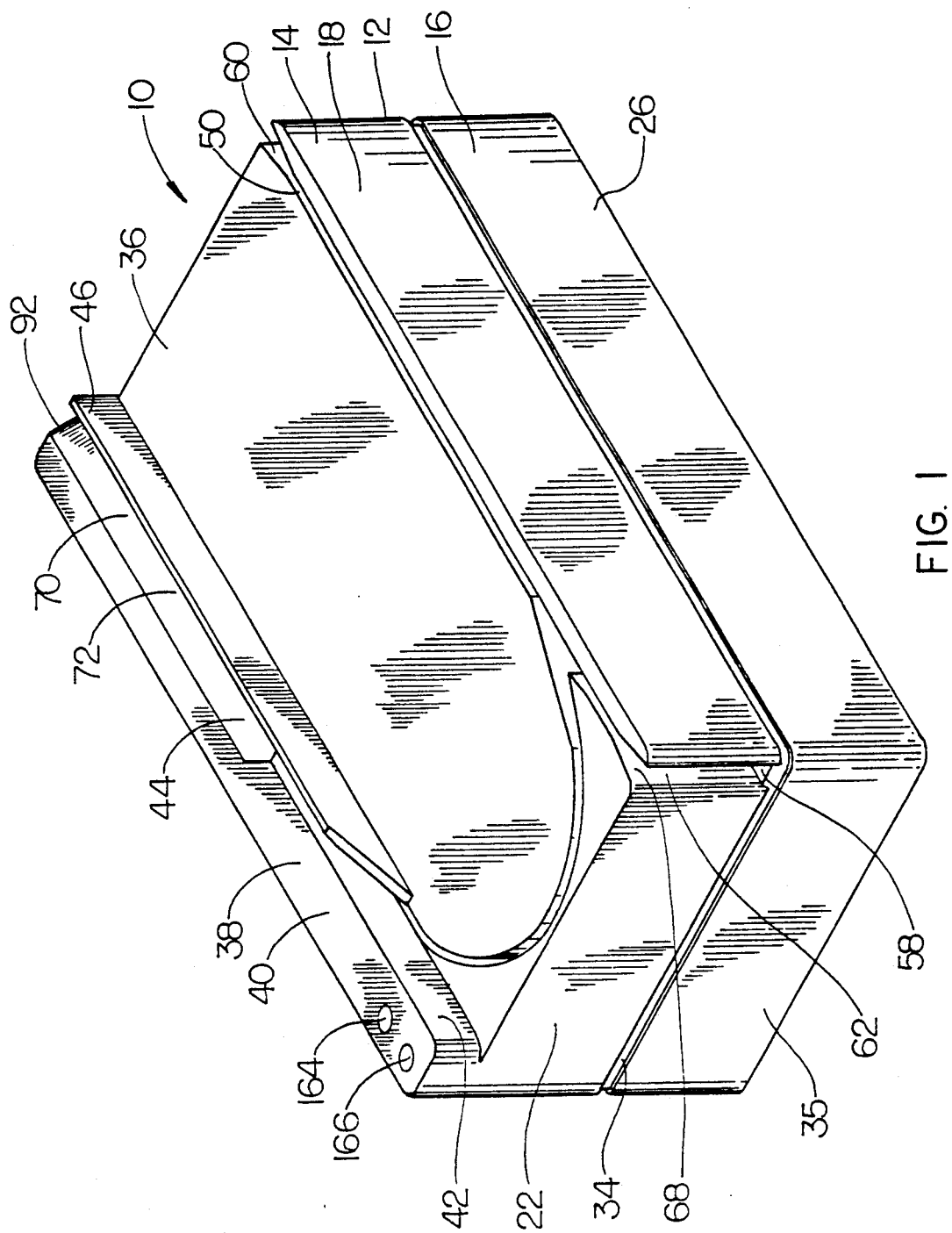
FIG. 1 is a perspective view of a magnetic stripe and MICR reader according to the present invention.
Figure 2:
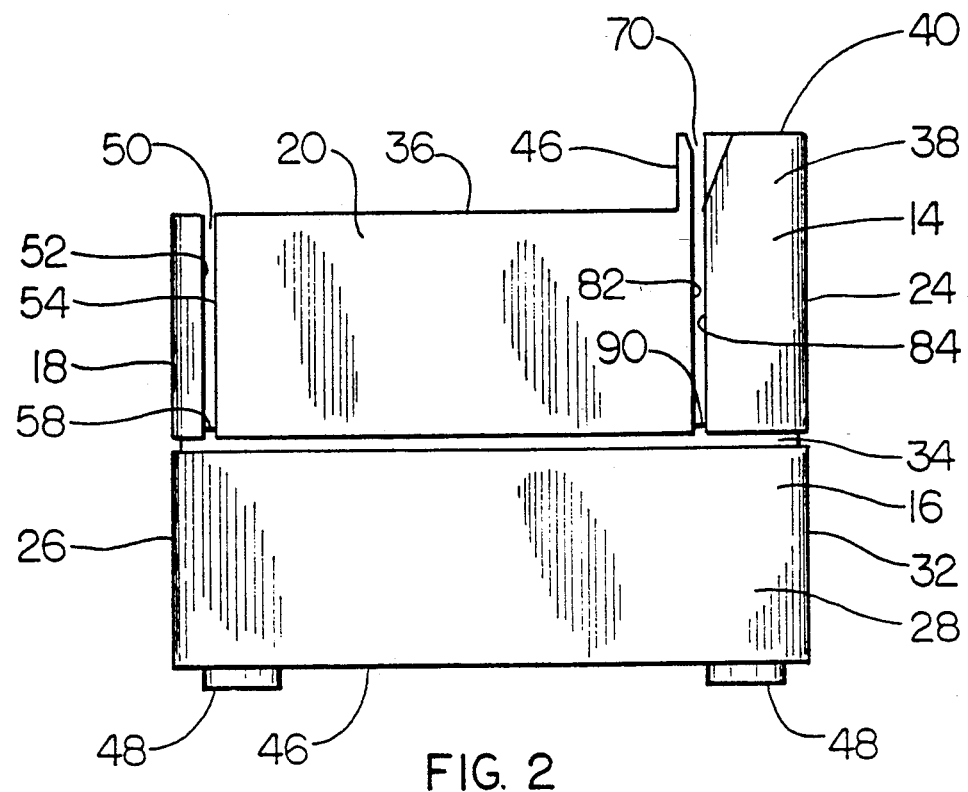
FIG. 2 is a right side elevational view of the reader of FIG. 1.
Figure 3:
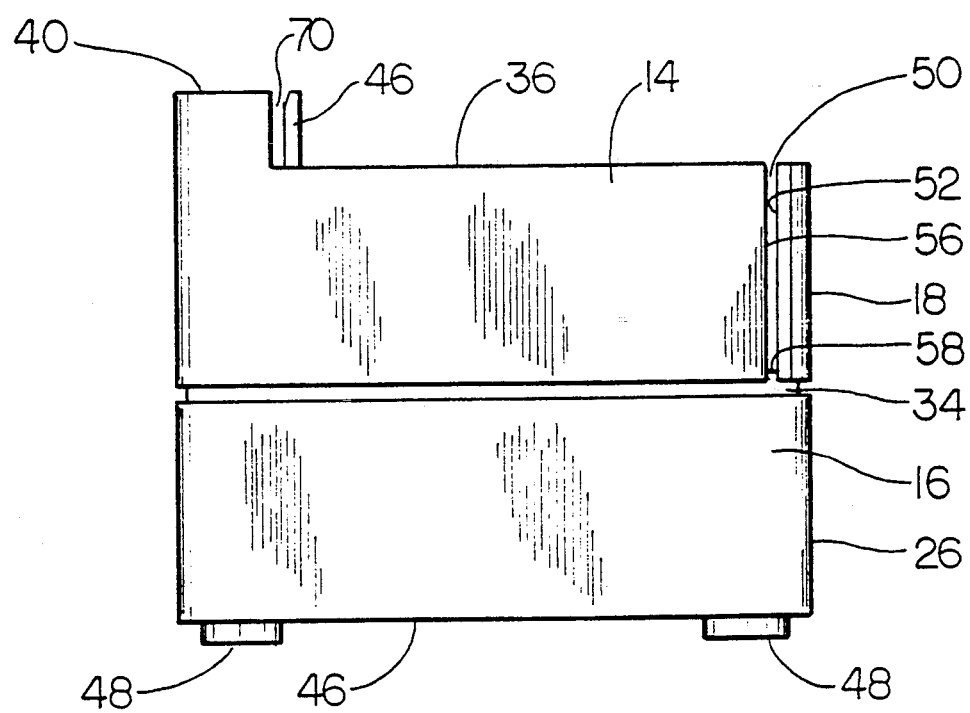
FIG. 3 is a left side elevational view of the reader of FIG. 1.
Figure 4:
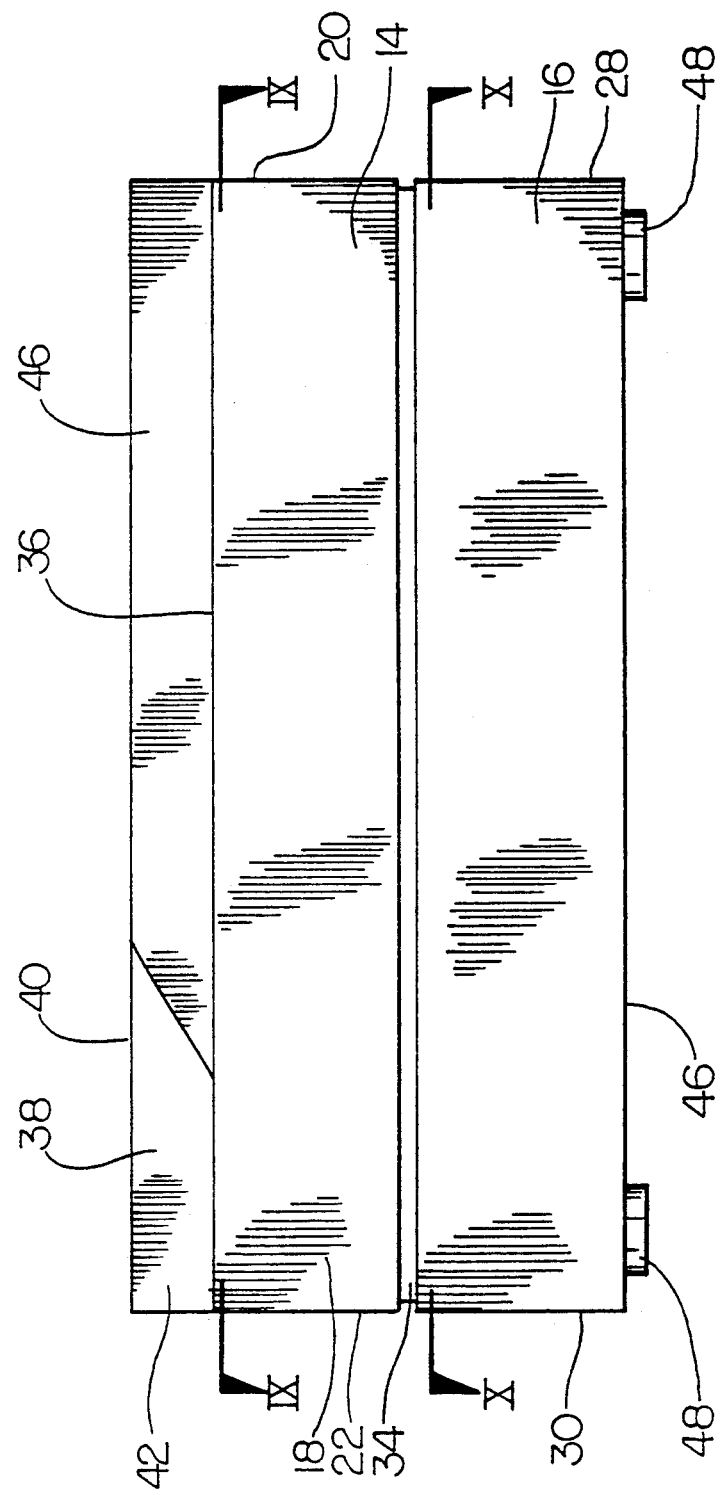
FIG. 4 is a front elevational view of the reader of FIG. 1.
Figure 5:
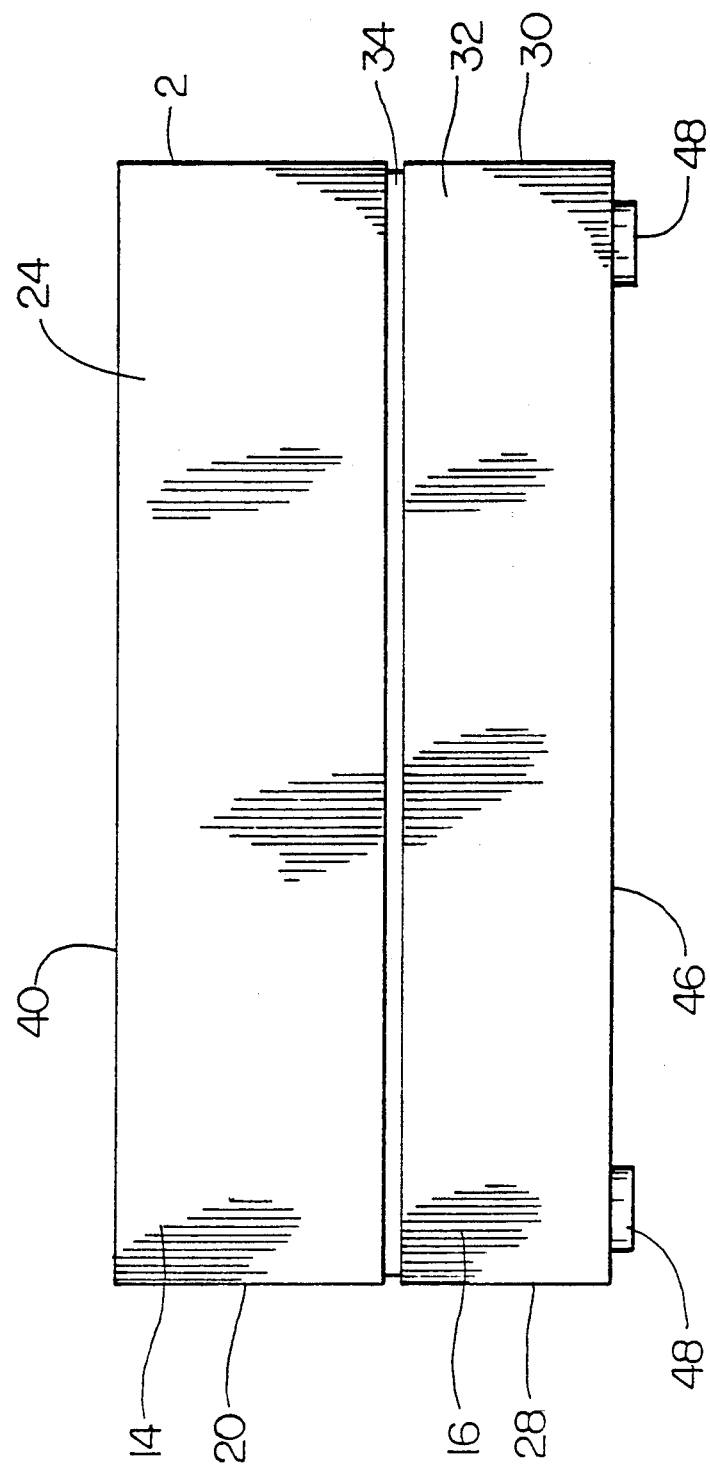
FIG. 5 is a rear elevational view of the reader of FIG. 1.
Figure 6:
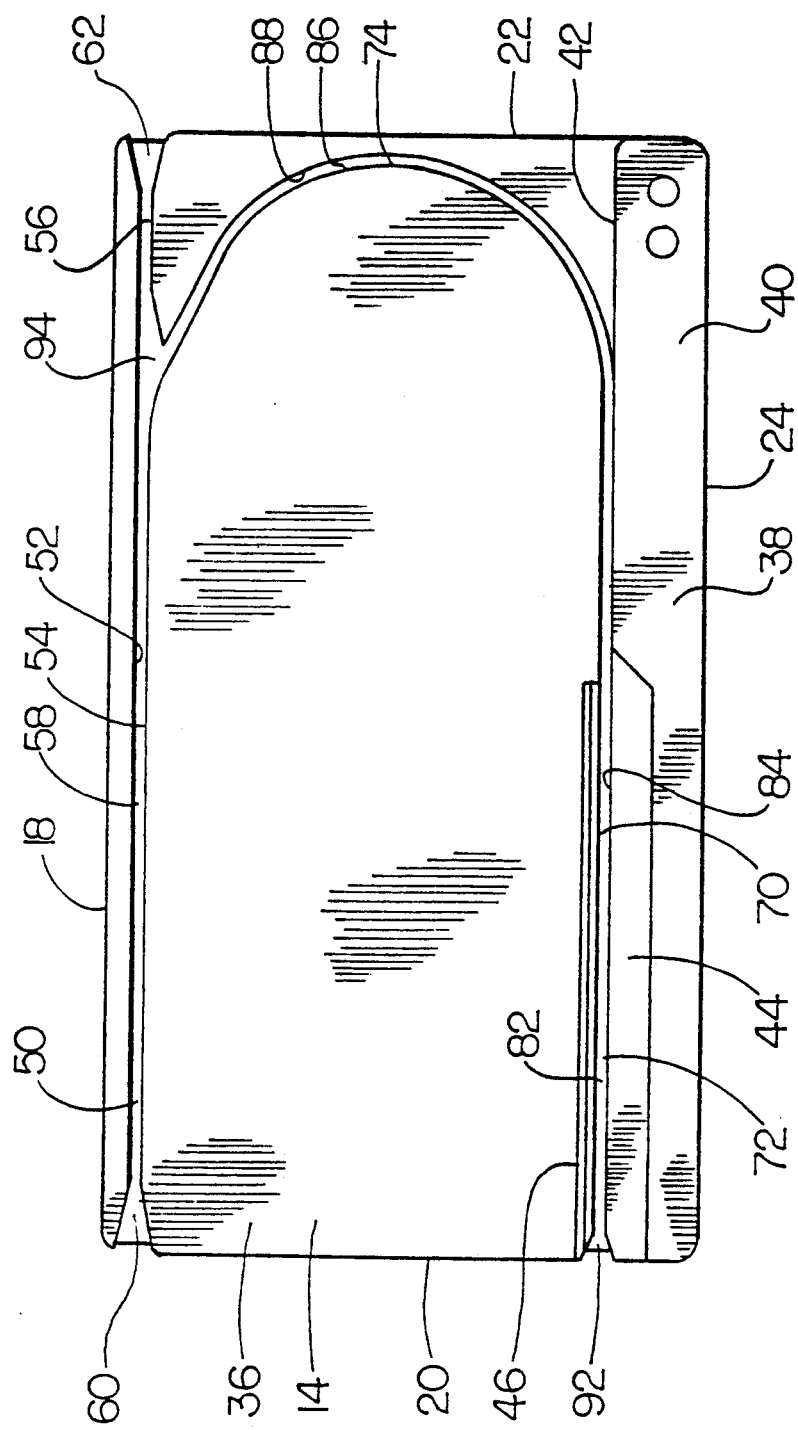
FIG. 6 is a top plan view of the reader of FIG. 1.
Figure 7:
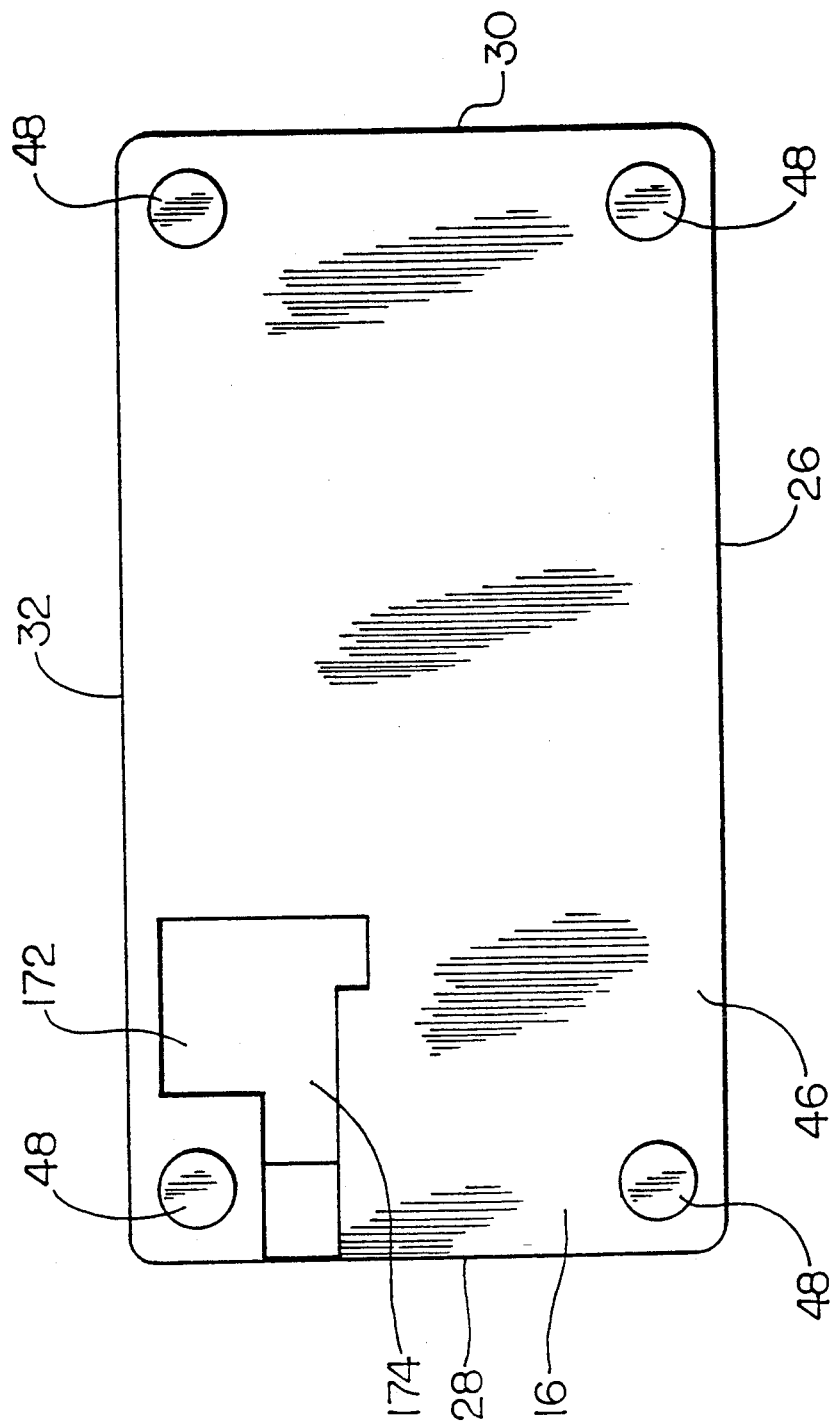
FIG. 7 is a bottom plan view of the reader of FIG. 1.

The magnetic ink character recognition (MICR) and magnetic stripe reader of the present invention is shown generally at 10 in FIG. 1. In the preferred embodiment shown, the reader comprises a housing 12 of a generally rectangular configuration. The housing has an upper housing 14 and lower housing 16. Upper housing 14 includes a front wall 18, right side wall 20, left side wall 22, and rear wall 24. Lower housing 16 includes front wall 26, right side wall 28, left side wall 30, and rear wall 32. A plate 34 extends generally horizontally through the interior of the housing 12 between the upper housing 14 and lower housing 16. The upper and lower housings and plate are removably interconnected, for example, by screws extending through aligned threaded holes (not shown) in the upper and lower housings. The plate 34 may be unitarily formed with either the upper or lower housing or may be a separate element. As described more fully below, the plate 34 serves as a mounting platform or chassis for many of the components of the reader.

The upper housing 14 further includes an upper surface 36 and a stepped portion 38. The stepped portion comprises a surface 40, a vertical wall 42, and an angled wall 44. An upstanding wall member 46 is provided adjacent the stepped portion 38. The lower housing 16 further includes a lower surface 46. Feet 48 may be provided on the lower surface 46. The upper and lower housings 14, 16 and plate 34 may be molded from a hard plastic, or formed in any other suitable manner.

A magnetic stripe channel 50 is formed in the surface 36 of the upper housing 14 toward the front wall 18 and extending from the right side wall 20 to the left side wall 22. The channel 50 is sized to receive a credit card or other medium bearing a magnetic stripe. The channel is defined by walls 52, 54, and 56 disposed in the interior of the upper housing 14. Plate 34 defines the floor 58 of the channel. An opening 60 to the first channel is provided in the right wall 20 and an opening 62 is provided in the left wall 22. In operation, a user inserts a card into either opening and passes the card along the channel and out the opposite opening while bearing against the floor of the channel, for contact with a magnetic stripe read head, to be described further below. Walls 52 and 54 are slightly angled at the opening 60 and walls 52 and 56 are slightly angled at the opening 62 to form a flared or funnel shape to aid in insertion and retrieval of the card.

Figure 8:
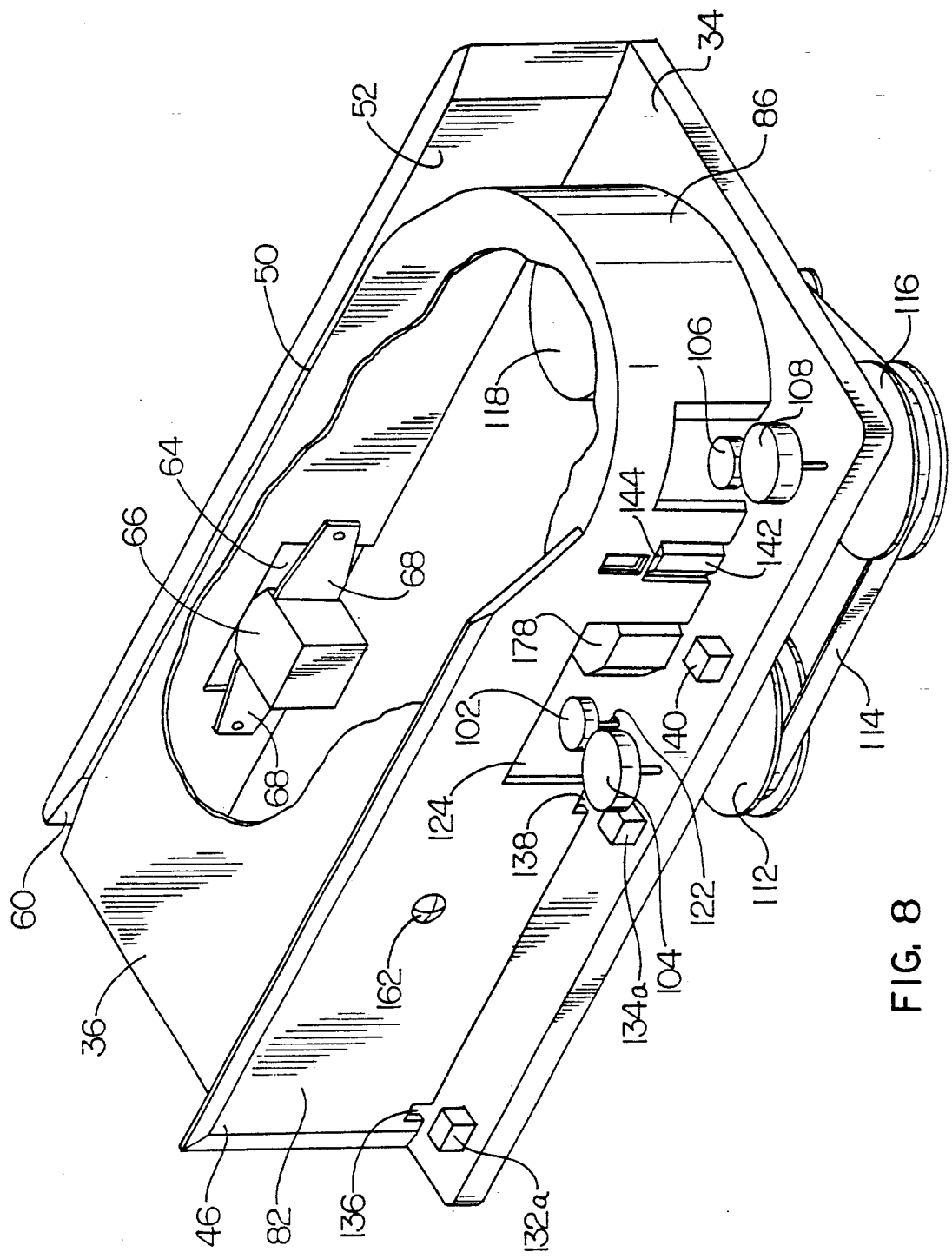
FIG. 8 is a partially cut away perspective view of the interior of the reader of FIG. 1.
Figure 9:
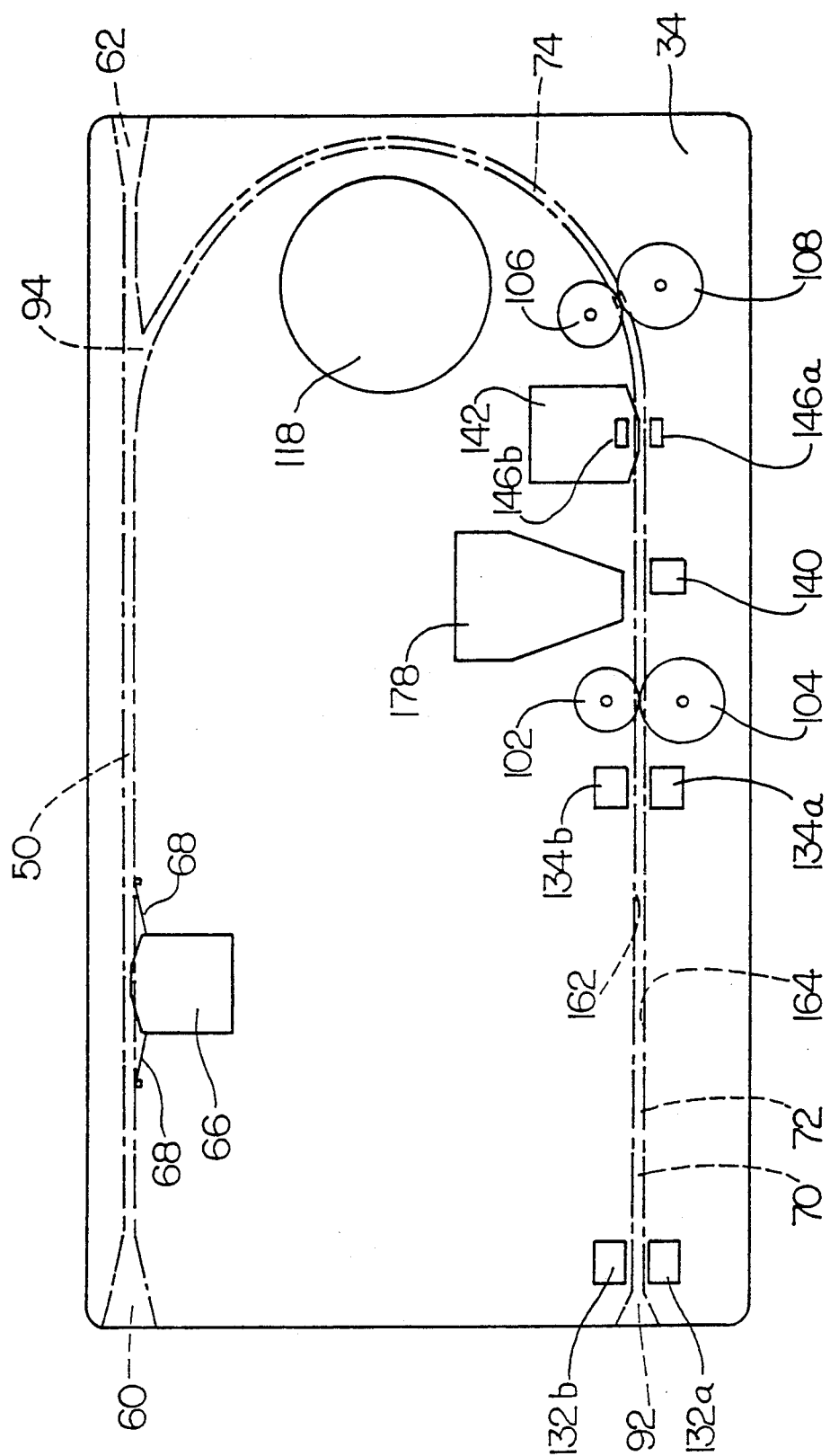
FIG. 9 is a partially cut away cross sectional view taken along line IX—IX of FIG. 4.
Figure 10:
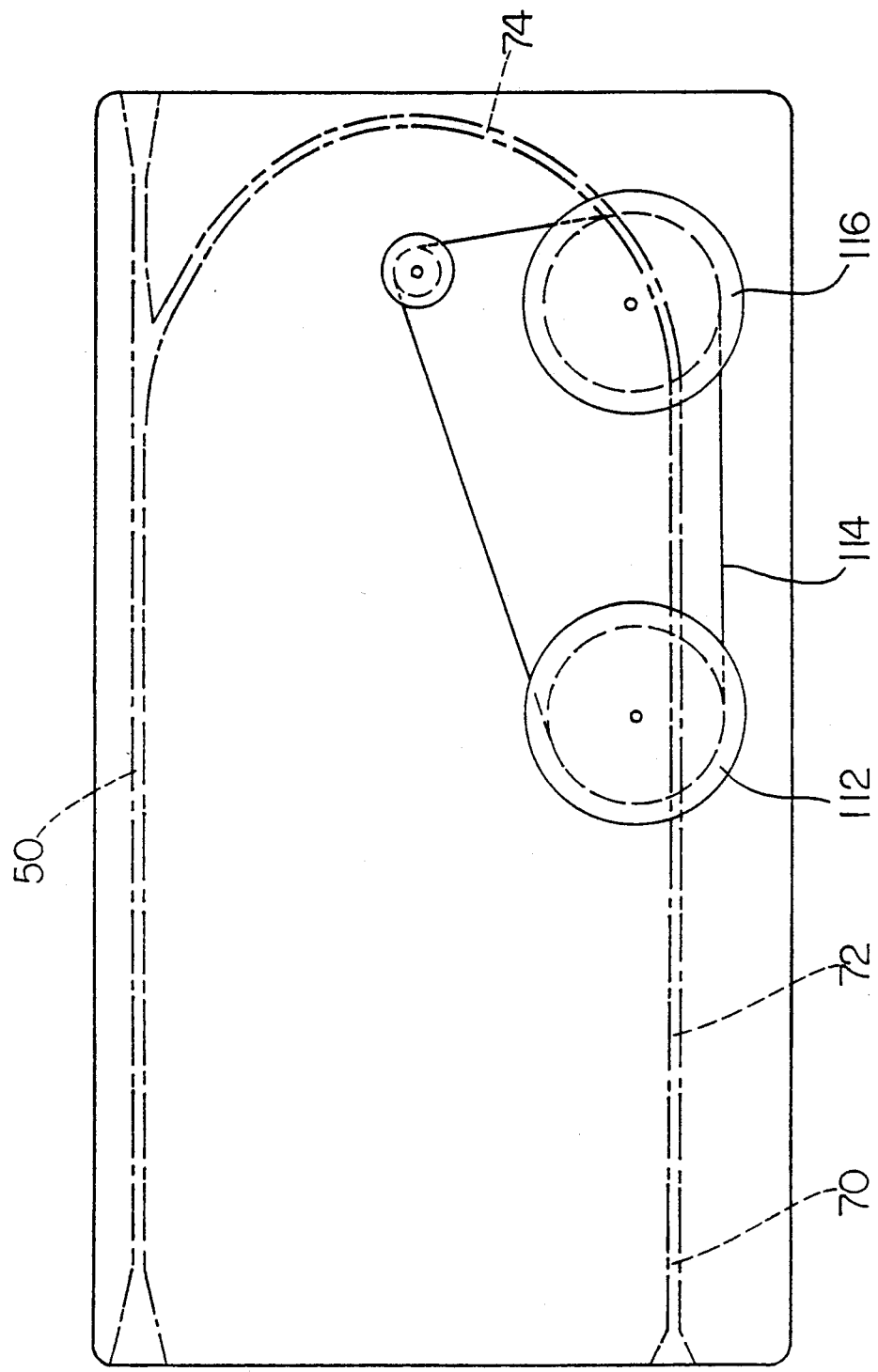
FIG. 10 is a further partially cut away cross sectional view taken along line X—X of FIG. 4.
Figure 11:
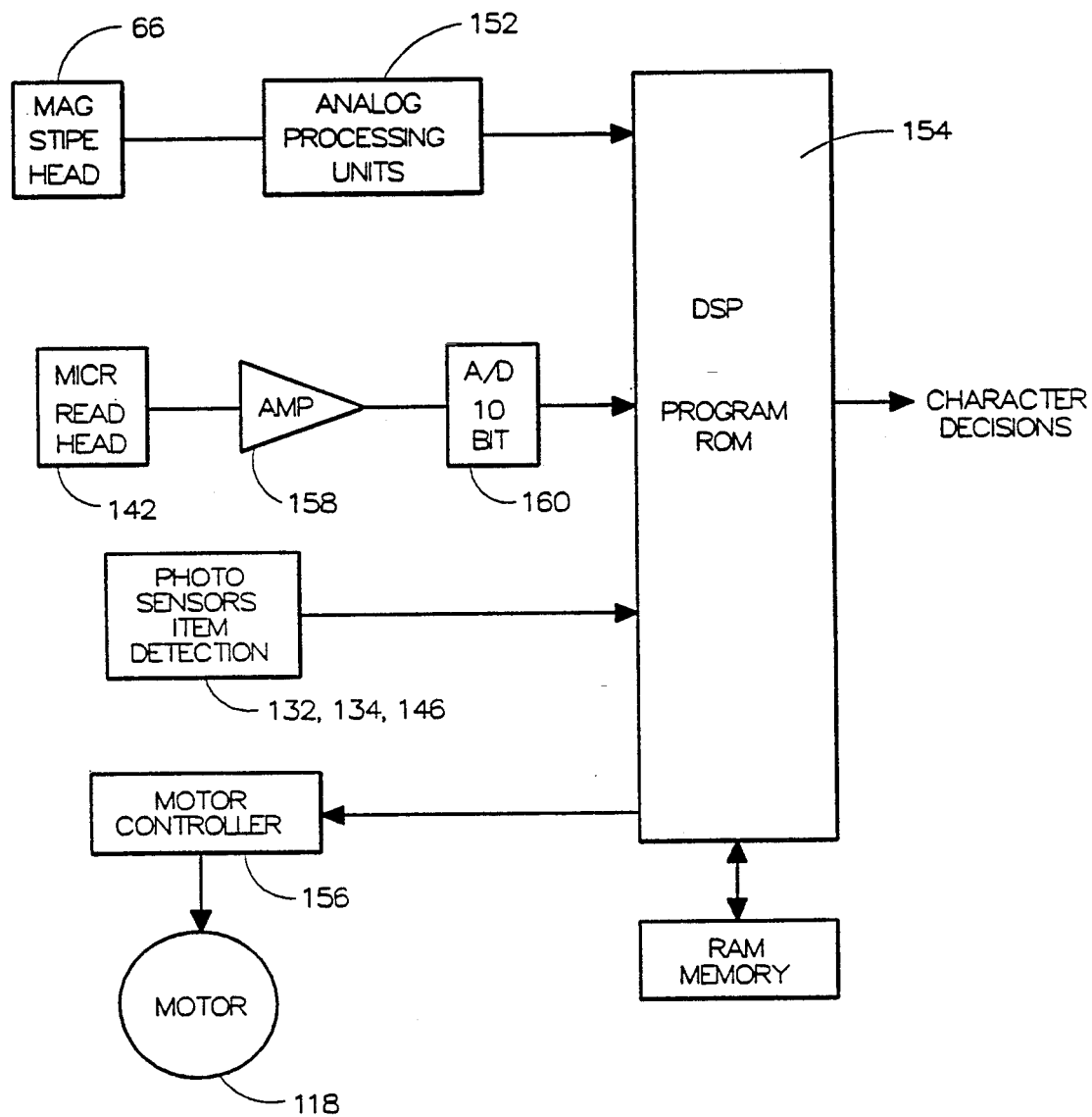
FIG. 11 is a schematic block diagram of the magnetic stripe and MICR reader according to the present invention.

As shown more particularly in FIG. 8, an opening or window 64 is formed in the wall 54 of the magnetic stripe channel 50 (shown in phantom in FIGS. 9 and 10). A magnetic stripe read head 66 extends slightly through this opening into the channel 50. Any suitable magnetic read head may be used. The read head 66 is spring mounted to bias the read head slightly into the channel 50, so that, as a credit card is slid along the channel, the card positively engages the read head and pushes the read head back slightly toward the interior of the housing. In this manner, good contact between the magnetic stripe and the read head is ensured, even if the stripe surface contains slight curvatures or other irregularities. Side mounted leaf-type springs 68 are shown, although any suitable biasing mechanism may be provided. As shown in FIG. 11, the read head 66 reads the magnetic stripe data and sends signals representative thereof to analog to digital processing circuitry 152 and to a digital signal processor 154 where a character recognition algorithm determines the specific characters encoded on the magnetic stripe. Known character recognition circuitry and recognition algorithms may be used. For simplicity of viewing, many of the components comprising the circuitry and processing functions have not been shown in FIGS. 8 and 10. Such components may be mounted in any suitable manner in either upper or lower housing 14 or 16.

A MICR channel 70 is formed in the upper housing 14. The MICR channel 70 is sized to receive a check or other medium bearing machine printed magnetic ink characters in a standardized format. The channel 70 comprises a straight path portion 72 extending from the right side wall 20 and between the stepped portion 38 and upstanding wall member 46. The channel 70 further comprises a curved path portion 74 interconnecting the straight path portion 72 and the magnetic stripe channel 50. The straight path portion 72 is defined by opposed straight walls 82 and 84, and the curved path portion is defined by opposed curved walls 86 and 88 disposed in the interior of the upper housing 14. The plate 34 defines the floor 90 of the channel 70. An entrance 92 to the straight path portion 72 of the channel 70 is provided in the right wall 20. Walls 82 and 84 are slightly angled at the entrance 92 to form a flared or funnel shape to aid in insertion of the check. The curved path portion terminates at an exit area 94, that interconnects with the magnetic stripe channel 50. The exit area 94 and magnetic stripe channel 50 are sized to prevent a credit card from entering the curved path portion, while allowing a check to enter the magnetic stripe channel, as described more fully below.

In operation, a user inserts a check into the entrance of the MICR channel 70. The flared entrance 92 and the angled wall 44 aid the user in inserting the leading edge of the check into the channel. A drive mechanism engages the check and moves the check along the channel.

As shown in FIGS. 8 and 9, the drive mechanism comprises a first capstan 102 and pinch roller 104 located along the straight path portion 72 and a second capstan 106 and pinch roller 108 located along the curved path portion 74. Each capstan 102 and 106 is associated with a drive pulley 112 and 116 respectively mounted in the lower housing 16 beneath the plate 34, as shown in FIGS. 8 and 10. The drive pulleys are connected by a belt 114 driven by a reversible motor 118. An opening 122 in the plate accommodates an axle from the drive pulley to the associated capstan. A further opening i the plate (not shown) is provided to accommodate the motor, which extends through both the upper and lower housing. An additional opening 124 is provided in the wall 82 to allow the capstan 102 to extend slightly into the channel 70 to contact the check. A corresponding opening (not shown) is provided in the wall 84 to allow the pinch roller 104 to extend slightly into the channel 70 to contact the check.

A set of optical detectors, each comprising a pair of emitter and detector elements 132a, 132b, and 134a, 134b, are provided on plate 34 near the floor 90 of the MICR channel to detect the presence of a check in the MICR channel. The first pair of emitter and detector elements 132a, 132b are located adjacent the entrance 92 and the second pair of emitter and detector elements 134a, 134b are located slightly before the first capstan 102. A suitable detector comprises a photosensor which signals the presence of an object, such as a check, when the object blocks a light path, although any other suitable detector may be used. Openings or windows 136 and 138 are provided in the wall 82 to accommodate the detector elements 132b and 134b. Similar openings (not shown) are provided in the wall 84 to accommodate the emitter elements 132a and 134a. The light path between each pair of emitter and detector elements lies through these openings. The first pair of elements 134a, 134b are spaced along the straight path portion 72 from the second pair of elements 132a, 132b a distance which is somewhat less than the length of a check. The presence of a check properly inserted in the straight path portion 72 of the MICR channel 70 with its bottom edge resting on the channel floor 90 and leading edge inserted just past the second pair of elements 134a and 134b causes both light paths to be blocked, and a signal indicative thereof is transmitted to the digital signal processor 154. The processor 154 signals a motor controller 156 (see FIG. 11) to actuate the motor 118 to drive the capstans 102 and 106 in a forward direction.

As the user continues to slide the check along the straight path portion of the channel, the check encounters the rotating first capstan 102 and associated pinch roller 104. The capstan and pinch roller engage the check and drive it along the channel. The leading edge of the driven check is subsequently engaged by the rotating second capstan 106 and associated pinch roller 108 located on the curved path portion 74, which assists in driving the check around the curved path portion. The capstans are preferably made of a hard rubber material, while the pinch rollers are made of a softer material, such as a urethane foam. Any suitable reversible motor may be provided.

The check is driven past a magnetizing head 140, comprising a permanent magnet which magnetizes the magnetic particles in the ink. The check is next driven past a read head 142, which detects the magnetization of the ink particles. Any suitable magnetizing and read heads may be provided. An opening or window 144 is formed in the wall 82 of the MICR channel 70 to provide access to the magnetized ink data by the read head 142. The magnetizing head 140 generally does not require a window, if the wall 84 is sufficiently thin, such as approximately 0.05 inch thickness or less. Signals representative of the characters are amplified by amplifier 158, converted to digital signals by A/D converter 160, and transmitted to the processor 154, which determines the specific characters using any suitable character recognition algorithm. Known character recognition circuitry and algorithms may be used. For simplicity of viewing, many of the components comprising the circuitry and processing functions are not shown in FIGS. 8-10. Such components may be mounted in any suitable manner in either upper or lower housing 14 or 16.

The second capstan 106 and pinch roller 108 of the drive mechanism continue to drive the check around the curved path portion 74 until the leading edge of the check extends partially into the magnetic stripe channel 50. A third pair of detector elements 146a, 146b, similar to the detector elements 132a, 132b and 134a, 134b, are located above the read head 142. The third detector elements 146a, 146b sense when the trailing edge of the check has passed and transmit a signal indicative thereof to the processor 154. The processor signals the motor controller 156 to stop the motor 118, so that the trailing edge of the check does not pass beyond the second capstan 106. The motor 118 is then reversed to drive the check back along the MICR channel 70 until its trailing edge extends back outside the entrance 92, where the check can be retrieved by the user. Preferably, the motor is reversed only for a period of time, such as approximately one second, sufficient to return the check to the retrieval position, after which the motor is stopped. However, a suitable detector could be provided to determine when the check is in the retrieval position, if desired.

The housing 12 and the MICR channel 70 are sized such that the leading edge of the check extends into the magnetic stripe channel 50 at the check's forwardmost point of travel. The housing has a length of approximately 6.5 to 7.5 inches and a width of approximately 3.5 to 4.0 inches. Accordingly, a long check, for example, between eight and nine inches, may occupy substantially the entire magnetic stripe channel. The magnetic stripe channel 50 thereby functions as a temporary storage area for the check. The MICR channel 70 is also sized so that the trailing edge of the check does not pass beyond the second capstan 106. In this manner, the second capstan maintains engagement with the check, so that the check can be driven in the reverse direction simply by reversing the direction of rotation of the second capstan. Additionally, magnetic stripe channel 50 and the straight portion of the MICR channel 70 are located on generally opposite sides of the housing. As shown, the magnetic stripe channel 50 is located near the front of the housing, and the MICR channel straight portion is located near the rear of the housing. The magnetizing head 140 and read head 142 are located adjacent the straight portion. In this manner, the magnetizing head is spaced sufficiently distant from the magnetic stripe channel so that the magnetizing head does not affect a magnetic stripe medium passing along the magnetic stripe channel. Although the magnetizing head 140 is shown on the rearmost side of the MICR channel 70, it could also be placed in an analogous position on the opposite side of the MICR channel without effecting media in the magnetic stripe channel.

A pair of buttons 162 and 164 or other slight protrusions are provided on the walls 82 and 84 respectively of the MICR channel 70. Since the channel is wider than the thickness of the check, the buttons slightly bend the check to better hold the check in the channel and prevent the check from flying too rapidly out of the channel. The buttons also prevent inadvertent entry of a magnetic stripe medium, such as a credit card, into the MICR channel, to prevent the magnetic stripe from coming too near the magnetizing head.

Signal indicators 164 and 166, such as light emitting diodes, are provided on the stepped portion 38 of the upper housing 14 to indicate various states of operation of the reader. For example, one signal indicator could be a green light to indicate a good read and the other signal indicator could be a red light to indicate a bad read. Additional signal indicators, of any suitable type, may be provided if desired.

The reader communicates with another device such as a computer or cash register via a connection port 172, such as for a serial interface. In this manner, the data embodied on the medium can be transmitted to the user's desired device for further processing. The port is typically provided in the lower surface 46 of the lower housing 16, although it may be positioned in any suitable location. Additionally, a power connection port 174 is provided in the lower surface of the lower housing 16, or any other desired location.

Optionally, an optical character reader may also be included in the device to accommodate applications in which it is desirable to read media bearing optical characters. In this case, an optical character read head 178 is located adjacent the straight portion 72 of the channel 70. The opening 124 in the wall 82 can be made large enough to accommodate the read head's access to the optical characters on the medium bearing such characters. Any known suitable optical read head may be used. Suitable optical character recognition circuitry (not shown) is also provided in the housing.

The invention is not to be limited by what has been particularly shown and described, except as indicated in the appended claims.

I claim:

1. An apparatus for reading data embodied in magnetic ink characters and a magnetic stripe, comprising:
    a housing having a generally rectangular configuration;
    a first channel in a top surface of said housing sized to permit a medium bearing a magnetic stripe thereon to be manually swiped through said first channel, said first channel disposed to extend longitudinally from opposed, longitudinally spaced end faces of said housing;
    a magnetic stripe read head disposed adjacent said first channel within said housing;
    a second channel in said top surface of said housing sized to slidingly receive a medium bearing magnetic ink characters thereon, said second channel comprising:
        a straight path portion disposed generally parallel to and spaced from said first channel and extending from one of said opposed end faces of said housing, and
        a curved path portion disposed to interconnect said straight portion and said first channel at a location of said first channel intermediate ends of said first channel;
    a magnetizing head and a magnetic ink character recognition read head disposed adjacent said second channel within said housing; and
    a processor in communication with said magnetic stripe read head and said magnetic ink character recognition read head to process data read by said magnetic stripe read head and said magnetic ink character recognition read head.

2. The apparatus of claim 1, further comprising:
    a reversible drive mechanism disposed adjacent the second channel to drive the medium bearing magnetic ink characters along said second channel in a forward direction to a position wherein a leading edge of the magnetic ink medium enters said first channel at said intermediate location and to further drive the medium in a reverse direction to a position wherein a trailing edge of the magnetic ink medium extends outside of said straight path portion at said one of said opposed end faces.

3. The apparatus of claim 2, wherein the drive mechanism comprises:
    a first drive element disposed along said straight path portion of said second channel;
    a second drive element disposed along said curved path portion of said second channel for driving the medium bearing magnetic ink characters along said second channel; and
    a reversible motor disposed within said housing for driving said first and second drive elements in a forward direction and a reverse direction.

4. The apparatus of claim 3, wherein the drive mechanism further comprises:
    a first sensor disposed adjacent to said straight portion of said second channel to detect insertion of the medium bearing magnetic ink characters into said second channel; and
    a second sensor disposed adjacent said second channel and between said first drive element and said second drive element to detect passage of a trailing edge of the medium bearing magnetic ink characters when the medium is driven in the forward direction;

5. The apparatus of claim 4, wherein said processor is further in communication with said first sensor and said motor to actuate said motor to drive said first drive element and said second drive element in the forward direction upon transmission of a signal from said first sensor representative of detection by said first sensor of the medium bearing magnetic ink characters in said straight portion of said second channel.

6. The apparatus of claim 4, wherein said processor is further in communication with said second sensor and said motor to actuate said motor to drive said first drive element and said second drive element in the reverse direction upon transmission of a signal from said second sensor representative of detection of the trailing edge of medium bearing magnetic ink characters.

7. The apparatus of claim 2, wherein the drive mechanism comprises a first capstan and pinch roller located on adjacent sides of said straight path portion and a second capstan and pinch roller located on adjacent sides of said curved path portion.

8. The apparatus of claim 1, further comprising a communication port.

9. An apparatus for reading data embodied in magnetic ink characters and a magnetic stripe, comprising:

a housing having a generally rectangular configuration;

a first channel in a top surface of said housing sized to slidingly receive a medium bearing a magnetic stripe thereon, said first channel disposed to extend longitudinally from opposed, longitudinally spaced end faces of said housing;

a magnetic stripe read head disposed adjacent said first channel within said housing;

a second channel in said top surface of said housing sized to slidingly receive a medium bearing magnetic ink characters thereon, said second channel comprising:

a straight path portion disposed generally parallel to and spaced from said first channel and extending from one of said opposed end faces of said housing, and a curved path portion disposed to interconnect said straight portion and said first channel at an intermediate location of said first channel;

a magnetizing head and a magnetic ink character recognition read head disposed adjacent said second channel within said housing, wherein said first channel is located generally adjacent one side of said housing and said straight path portion is located generally adjacent an opposite side of said housing and spaced apart from said first channel to isolate said first channel from interference with said magnetizing head and said magnetic ink character recognition read head.

10. The apparatus of claim 1, further comprising an optical character read head disposed adjacent said second channel within said housing.

11. The apparatus of claim 10, wherein said processor is further in communication with said optical character read head to process data read by said optical character read head.

12. The apparatus of claim 1, further comprising at least one protrusion within said second channel sized to frictionally engage the magnetic ink medium and to preclude passage of the magnetic stripe medium.

13. An apparatus for reading data embodied in magnetic ink characters and a magnetic stripe, comprising:

a housing having a generally rectangular configuration and comprising a base, a top surface, opposed longitudinally extending sides, and opposed end faces;

a first channel in said top surface sized to permit a medium bearing a magnetic stripe thereon to be manually swiped through said first channel, said first channel disposed to extend longitudinally from one of said opposed end faces to the other of said opposed end faces;

a magnetic stripe read head disposed adjacent said first channel within said housing;

a second channel in said top surface sized to slidingly receive a medium bearing magnetic ink characters thereon, said second channel having a straight portion disposed generally parallel to said first channel and extending from one of said opposed end faces of said housing, said second channel further having a curved portion disposed to interconnect said straight portion and said first channel at an intermediate location thereof;

a first motor-driven capstan and a first pinch roller disposed on opposite sides of said straight portion of said second channel within said housing, and a second motor-driven capstan and a second pinch roller disposed on opposite sides of said curved portion of said second channel within said housing, for driving the medium bearing magnetic ink characters along said second channel;

a reversible motor disposed within said housing for driving said first and second capstans in a forward direction and a reverse direction;

a first sensor disposed adjacent to said straight portion of said second channel to detect insertion of the medium bearing magnetic ink characters into said second channel; and a second sensor disposed adjacent said second channel and between said first capstan and said second capstan to detect a trailing edge of the medium bearing magnetic ink characters;

a magnetizing head disposed adjacent said second channel within said housing;

a magnetic ink character recognition read head disposed adjacent said second channel within said housing;

a processor disposed within said housing in communication with said magnetic stripe read head and said magnetic ink character recognition read head to process data read by said magnetic stripe read head and said magnetic ink character recognition read head, said processor further in communication with said first sensor and said second sensor to actuate said motor to drive said first capstan and said second capstan in the forward direction upon transmission of a signal from said first sensor representative of detection by said first sensor of the medium bearing magnetic ink characters in said straight portion of said second channel and to actuate said motor to drive said first capstan and said second capstan in the reverse direction upon transmission of a signal from said second sensor representative of detection of the trailing edge of medium bearing magnetic ink characters; and an interface connection port.

14. The apparatus of claim 12, further comprising an optical character read head disposed adjacent said second channel within said housing and wherein said processor is further in communication with said optical character read head to process data read by said optical character read head.

15. The apparatus of claim 1, further comprising:

a drive mechanism disposed adjacent said second channel to drive the medium bearing magnetic ink characters along said second channel in a forward direction to a position wherein a leading edge of the magnetic ink medium enters said first channel at said intermediate location and a trailing edge of the magnetic ink medium remains in said second channel.

16. The apparatus of claim 15, wherein said drive mechanism is reversible to further drive the medium in a reverse direction to a position wherein the trailing edge of the magnetic ink medium extends outside of said straight path portion at said one of said opposed end faces.

17. The apparatus of claim 1, wherein said processor is disposed within said housing.

* * * * *